(12) United States Patent
Khidekel

(10) Patent No.: US 10,189,558 B2
(45) Date of Patent: Jan. 29, 2019

(54) OPTIMIZED NACELLE PROFILE AND PLENUM SHAPE FOR BOUNDARY LAYER INGESTION ACTIVE LAMINAR FLOW CONTROL

(71) Applicant: Rohr, Inc., Chula Vista, CA (US)

(72) Inventor: Ann E. Khidekel, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 233 days.

(21) Appl. No.: 14/692,414

(22) Filed: Apr. 21, 2015

(65) Prior Publication Data

US 2016/0311520 A1    Oct. 27, 2016

(51) Int. Cl.
  *B64C 7/02*       (2006.01)
  *B64C 21/06*      (2006.01)
  *B64D 27/16*      (2006.01)
  *B64D 29/02*      (2006.01)
  *B64D 33/02*      (2006.01)

(52) U.S. Cl.
  CPC ............... *B64C 7/02* (2013.01); *B64C 21/06* (2013.01); *B64D 27/16* (2013.01); *B64D 29/02* (2013.01); *B64C 2230/06* (2013.01); *B64C 2230/08* (2013.01); *B64C 2230/20* (2013.01); *B64C 2230/22* (2013.01); *B64D 2033/0226* (2013.01); *Y02T 50/166* (2013.01)

(58) Field of Classification Search
  CPC ....... B64C 7/02; B64C 21/06; B64C 2230/06; B64C 2230/08; B64C 2230/20; B64C 2230/22; B64D 29/01; B64D 27/16
  See application file for complete search history.

(56) References Cited

U.S. PATENT DOCUMENTS

| | | | |
|---|---|---|---|
| 2,562,227 A | 7/1951 | Zobel | |
| 4,799,633 A | 1/1989 | Lahti | |
| 4,993,663 A | 2/1991 | Lahti | |
| 5,297,765 A | 3/1994 | Hughes | |
| 5,618,363 A * | 4/1997 | Mullender | B29C 33/52 156/155 |
| 5,803,409 A | 9/1998 | Keefe | |
| 6,027,078 A | 2/2000 | Crouch | |
| 7,048,230 B2 * | 5/2006 | Meyer | B64D 33/02 244/130 |
| 8,197,191 B2 * | 6/2012 | Binks | B64D 29/08 415/119 |
| 8,282,037 B2 * | 10/2012 | Jain | B64D 29/00 244/207 |
| 8,844,553 B2 | 9/2014 | Zysman | |
| 2005/0045774 A1 | 3/2005 | Hocking | |
| 2008/0265100 A1 | 10/2008 | Crouch | |
| 2009/0121083 A1 | 5/2009 | Jain | |

(Continued)

OTHER PUBLICATIONS

EP search report for EP16166460.2 dated Oct. 7, 2016.

(Continued)

*Primary Examiner* — Jason Shanske
*Assistant Examiner* — Michael Sehn
(74) *Attorney, Agent, or Firm* — O'Shea Getz P.C.

(57) ABSTRACT

Aspects of the disclosure are directed to a nacelle of an aircraft, comprising a surface that is profiled such that during cruise flight operation lines of constant static pressure of a boundary layer around the nacelle in a given region are substantially contained within a plane that is normal to an engine axis.

7 Claims, 7 Drawing Sheets

(56) References Cited

U.S. PATENT DOCUMENTS

2010/0260602 A1 10/2010 Binks et al.
2013/0156542 A1* 6/2013 Suciu .................. F01D 21/045
                                                        415/1

OTHER PUBLICATIONS

Roland Wilhelm, "An Inverse Design Method for Engine Nacelles and Wings", ICAS 24th International Congress of The Aeronautical Sciences, ICAS 2004.
John E. Green, "Laminar Flow Control—Back to the Future?", 38th Fluid dynamics Conference and Exhibit, Seattle, Washington Jun. 23-26, 2008.
W.K. Lord, "AIAA 2000-2234 Flow Control Opportunities in Gas Turbine Engines", Fluids 2000, Denver, Colorado, Jun. 19-22, 2000.
S. Raghunathan, "Key Aerodynamic Technologies for Aircraft Engine Nacelles", The Aeronautical Journal, pp. 265-288, May 2006.
Albert Braslow, "A History of Suction-Type Laminar-Flow Control with Emphasis on Flight Research", Monographs in Aerospace History, No. 13, 1999.
Ronald D. Joslin, "Overview of Laminar Flow Control", NASA/TP-1998-208705, Oct. 1998.
"Clean Sky 2 Will Set Stage for Next Generation of Airliners", Aviation Daily, Jan. 8, 2014.
Michael Gubisch, "Go With the Flow: A Pan-European Effort to Develop a Laminar Flow Wing for the Next Generation of Narrowbodies Could Yield Reductions in Fuel Burn", Flight International, Jul. 26-Aug. 1 2011, pp. 24-26.
Geza Schrauf, "The Need of Large-Scale HLFC Testing in Europe", Airbus Operations GmbH, Jan. 8, 2014.
Max Kingsley-Jones, "Farnborough: Aero Secrets of Boeing's New Dreamliner", Flight Global, Jul. 18, 2014.
Steve Wilhelm, "Powerwash Gets the Bugs Off Boeing's Secret 787-9 Laminar Flow System", Puget Sound Business Journal, May 7, 2014.
Mount et al. "Development of an Active Laminar Flow Nacelle", AIAA/SAE/ASME/ASEE 21st Joint Propulsion Conference, Jul. 8-10, 1985.
Ronald D. Joslin, "Aircraft Laminar Flow Control", Annual Review of Fluid Mechanics 1998: vol. 30: 1-29.
Anthony Washburn, "Draft Reduction Status and Plans—Laminar Flow and AFC", AIAA Aero Sciences Meeting, Jan. 4-11, 2011.
European Commission, "Hybrid Laminar Flow Technology (HYLTEC")", Jan. 1, 1998.
John E. Green, "Laminar Flow Control—Back to the Future?" 38th Fluid Dynamics Conference and Exhibit, Jun. 23-26, 2008.
John R. Chambers, "Innovation in Flight", NASA SP-2005-4539, Aug. 22, 2005.

* cited by examiner

OPTIMIZED NACELLE PROFILE AND PLENUM SHAPE FOR BOUNDARY LAYER INGESTION ACTIVE LAMINAR FLOW CONTROL

BACKGROUND

A nacelle is the housing for a turbofan gas turbine engine used to power, for example, a commercial airliner. The nacelle and the engine together are referred to as the propulsion system or power plant of the aircraft. The nacelle forms the external aerodynamic surfaces of the propulsion system, and also helps form the duct for the bypass air from the fan, as well as encloses all the components and auxiliary devices surrounding and attached to the engine. The nacelle may also optionally provide a reverse thrust means to generate reverse thrust to slow the aircraft, for example during landing. FIG. 1 illustrates a typical gas turbine engine inside a nacelle 22, which are together attached via a pylon 21 to the underside of an aircraft wing 20. The nacelle 22 includes a forward section 23 and an aft section 12. The forward section 23 may be formed from an inlet and a fan cowl, which could be combined together. The aft section 12 may include a thrust reverser.

In operation, an ambient air flow 56 on the exterior of the nacelle 22 generates drag. The drag force increases fuel consumption. Accordingly, it is desirable to minimize the drag.

If the flow around the nacelle 22 is laminar the drag force will be reduced compared to a turbulent flow. Aircraft and nacelle designers have utilized nacelle external aerodynamic shapes that maintain a natural laminar flow over a portion of the first section 23 of a nacelle. By carefully selecting the aerodynamic profile (which is done through analysis including computational fluid dynamics, and through experimentation), natural laminar flow can be achieved beginning at the inlet lip and extending back as much as 10-30 inches. The portion where it is desired to achieve laminar flow much be clean of debris (e.g., bugs) and very aerodynamically smooth (e.g., fastener heads must be very flush and parallel with the surrounding surface). Steps and gaps can cause the laminar flow to trip and transition to turbulent flow. Many other active or hybrid natural/active techniques have been proposed for achieving and maintaining laminar flow on an aircraft nacelle and other aircraft surfaces. One such technique is through boundary layer ingestion or suction where the boundary layer next to the aircraft surface is pulled through small holes in the surface to remove the low energy boundary layer and regenerate it or maintain it at a minimum energy level. Active or hybrid laminar flow techniques may achieve and maintain laminar flow more consistently than natural means alone, and may be able to extend further aft the region on first section 23 of nacelle 22 which has laminar flow.

While boundary layer suction or ingestion has been proposed for use on an aircraft surface such as an aircraft nacelle for drag reduction, no successful commercial systems have flown yet. There is a need for solutions to the many practical problems that remain to be solved.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a nacelle of an aircraft, comprising a surface that is profiled such that during cruise flight operation lines of constant static pressure of a boundary layer around the nacelle in a given region are substantially contained within a plane that is normal to an engine axis. In some embodiments, a rib associated with one of the lines of constant static pressure is located at a substantially fixed location with respect to a reference direction associated with the nacelle. In some embodiments, the reference direction is an axial reference direction that is aligned with the engine axis. In some embodiments, the rib is oriented with a variation in an axial reference, where the axial reference direction is aligned with the engine axis. In some embodiments, the nacelle further comprises a first plenum, and a second plenum, where the first and second plenums are separated from one another by one of the lines of constant static pressure. In some embodiments, the first plenum is configured to traverse a substantial portion of a circumference of the nacelle. In some embodiments, the nacelle further comprises a zone formed in a skin of the nacelle, where the zone comprises perforations that are configured to enable a suction of air. In some embodiments, the perforations are configured to draw air from an air flow that is external to the nacelle into the nacelle. In some embodiments, a location of the zone on the nacelle corresponds to a location of a first plenum on the nacelle.

Aspects of the disclosure are directed to a nacelle of an aircraft, comprising a plurality of plenums that are divided by axial and circumferential ribs, where the circumferential ribs are not straight. In some embodiments, at least one of the circumferential ribs does not lie in a plane that is normal to an engine axis.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
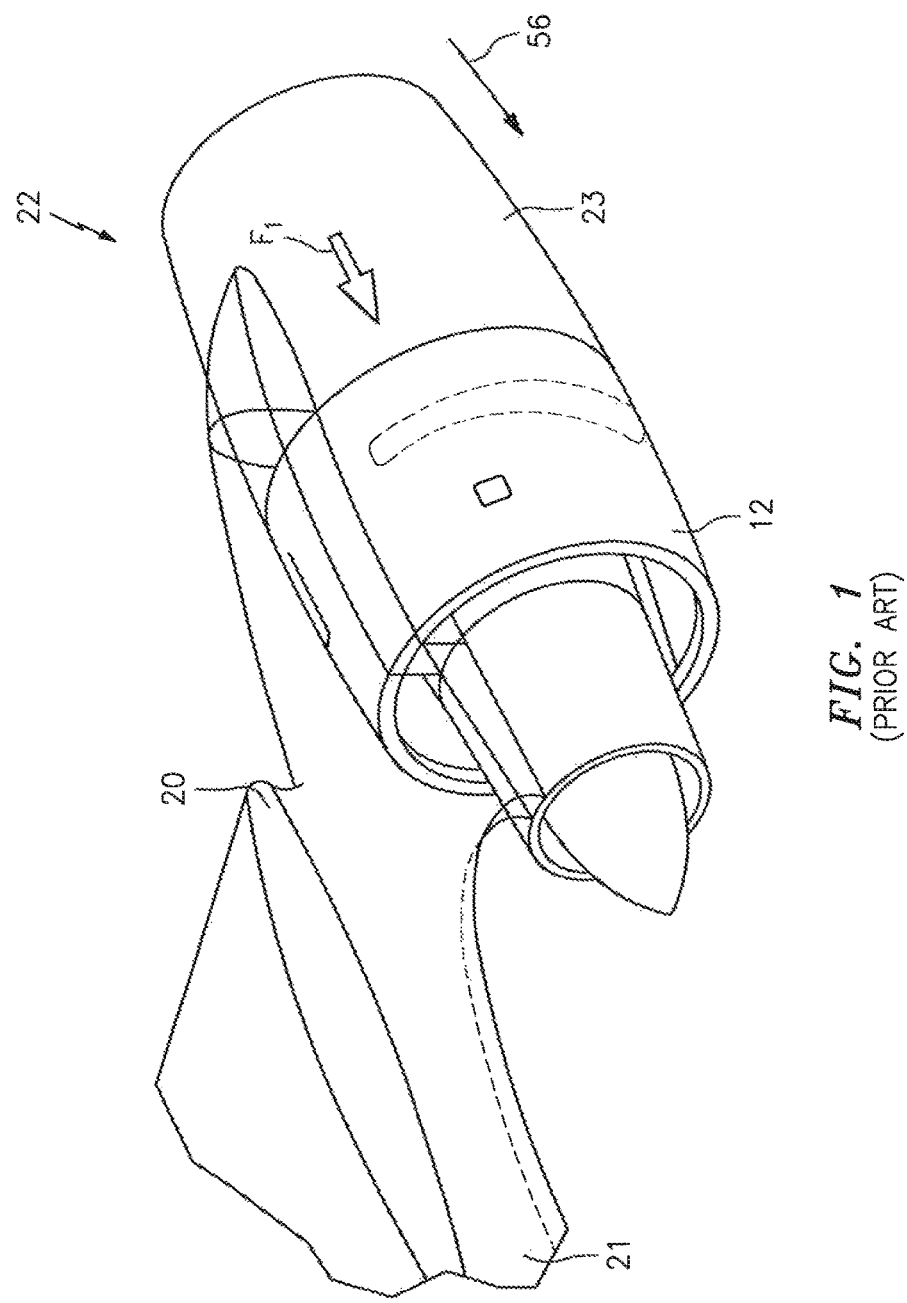
FIG. 1 illustrates components and devices associated with an aircraft nacelle in accordance with the prior art.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for reducing/minimizing drag associated with a nacelle of the aircraft. For example, aspects of the disclosure may reduce/minimize drag attributable to a flow on the exterior of the nacelle. Aspects of the disclosure may be implemented as part of active laminar flow control (ALFC) system.

Figure 2A:
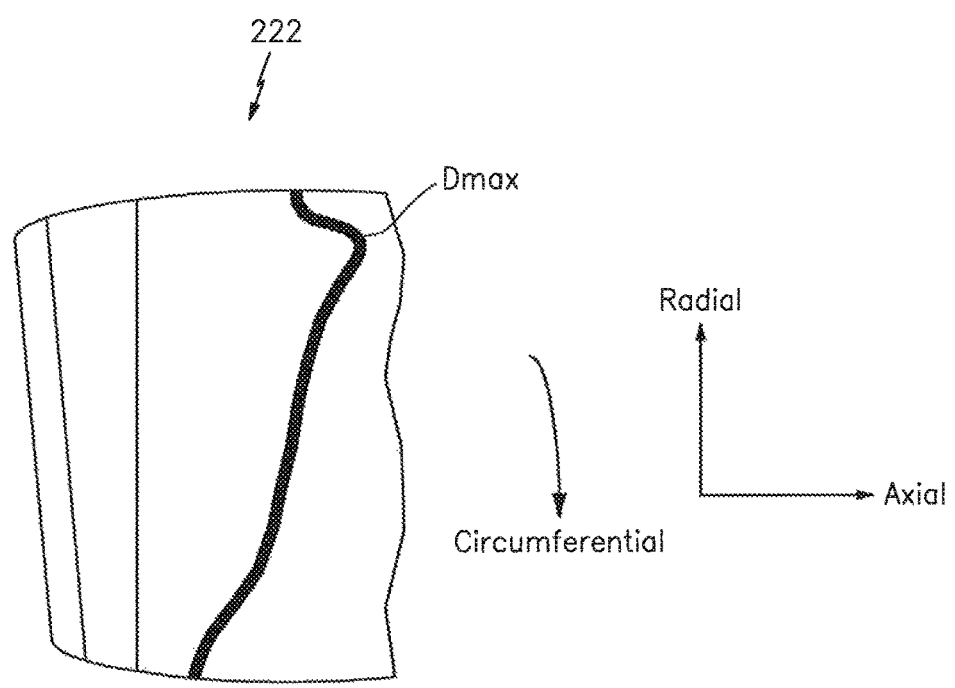
FIG. 2A illustrates a side perspective view of a nacelle including a reference line denoting a maximum diameter associated with the nacelle.

Referring now to FIG. 2A, a portion of a nacelle 222 is shown. Superimposed in FIG. 2A are axial, radial, and circumferential reference directions. Any point or location within or on the nacelle 222 may be specified by a value for each of these reference directions.

Superimposed on the nacelle 222 is a reference line $D_{max}$. $D_{max}$ denotes the maximum diameter of the nacelle 222 (as measured from the center of the nacelle 222 along the axial direction) at every location along the nacelle 222 around the circumference of the nacelle 222. As illustrated, the line $D_{max}$ is often not fixed at a given axial location, i.e. it is not contained in the same plane normal to the axis of the engine. Instead, the line $D_{max}$ appears "wavy" with substantial/appreciable variation in an axial direction. The position of $D_{max}$ is likewise influenced by the many factors that shape the external aerodynamic surface of the nacelle, which include space claims for components housed within the nacelle (for instance, on some aircraft a gearbox mounted on the fan case causes a very noticeable bulge in the shape of the front section of the nacelle), interactions with the wing aerodynamics, the requirements for the air flow into the engine and fan, etc. This illustration of $D_{max}$ helps visualize the relatively varying external aerodynamic shape of the nacelle. In some cases it can be difficult to achieve an external aerodynamic shape of the nacelle for natural laminar flow given all the constraints and trades. This illustration of $D_{max}$ also helps to visualize the lines of constant static air pressure around the exterior of the nacelle. Similar to $D_{max}$, the lines of constant static pressure vary substantially/appreciably in the axial direction, i.e. they are not contained in the same plane normal to the axis of the engine.

Proposed boundary layer suction in active laminar flow systems would include small holes formed in the external surface of the nacelle where, according to analysis, it will be necessary to remove or ingest some of the boundary layer to prevent tripping to turbulent flow. A suction or pressure gradient/pressure differential is applied across these holes to pull boundary layer air through them and into the nacelle. The rate of flow through the holes, or rate of boundary layer ingestion, will be a factor of this pressure gradient, as well as the size and shape of the hole, among other factors. The rate of boundary layer ingestion is crucial in successfully actively maintaining the laminar flow. For manufacturing simplicity, the size and shape and spacing of the holes would ideally be the same or similar across the active laminar flow control surface. This means that in order to control the rate of ingestion, the principle variable to control would be the pressure differential across the holes.

Figure 2B:
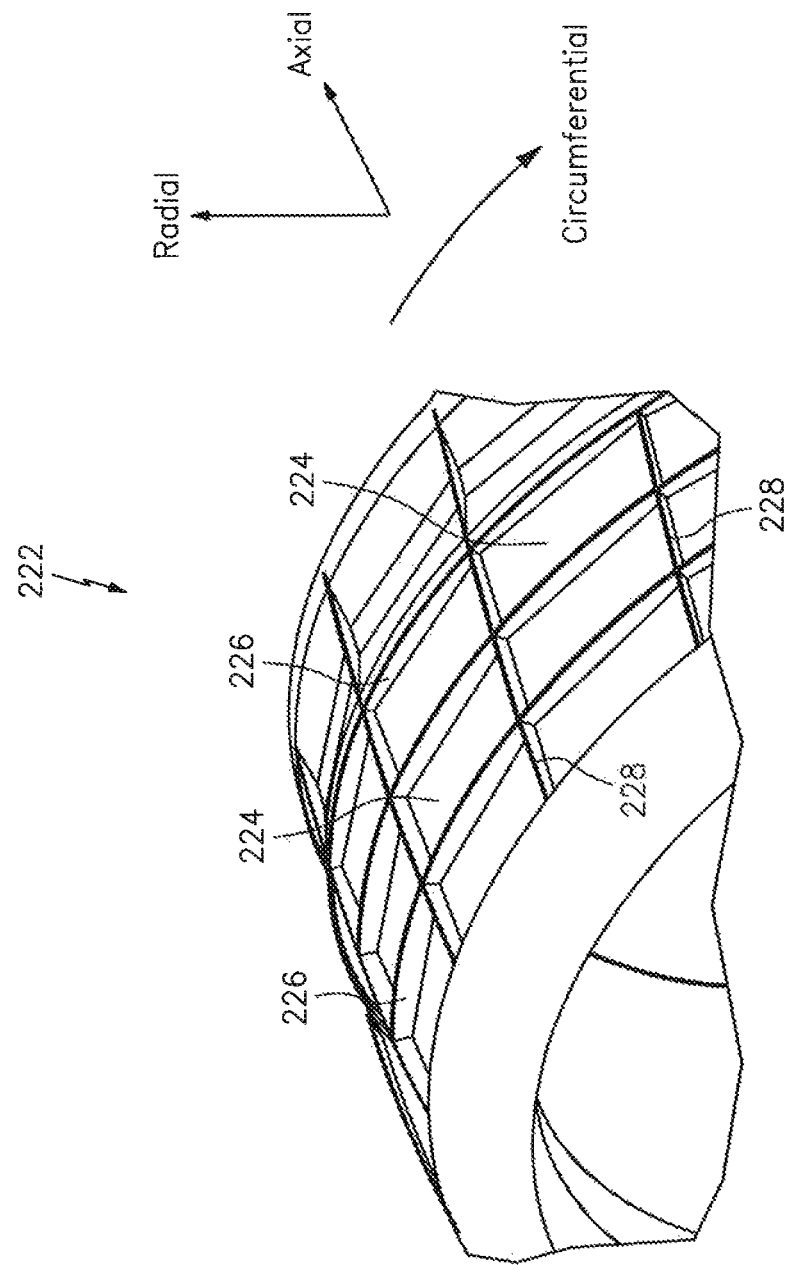
FIG. 2B illustrates plenums formed by ribs in the nacelle of FIG. 2A for providing suction for boundary layer ingestion through small holes formed in the nacelle skin.

Maintaining the desired pressure gradient across each hole is complicated by the fact that, as previously discussed, the static pressure of the air in the boundary layer changes. The pressure gradient is the difference between the static pressure on the external of the nacelle surface immediately outside of the hole, and the lower or suction pressure inside. Because the external static pressure outside of the holes varies significantly, the internal lower or suction pressure must also vary in order to have a relatively consistent pressure gradient, or to achieve the pressure gradient needed for a given region. Thus, a single region of reduced air pressure or suction on the inside of the holes will not be sufficient, most likely varying regions of suction will be necessary. Cavities/plenums 224 formed under the nacelle external skin as shown in FIG. 2B may be used to achieve the needed regions of varying suction pressure. Cavities/plenums 224 may be defined in part by a first set of circumferential ribs 226 and a second set of axial ribs 228. In combination with a bottom plenum surface and the external surface, the linear ribs 226 and 228 form cavities/plenums that will have individually tunable suction pressures to correspond with the external static pressure of the boundary layer on the other side of the external skin from the particular plenum. As long as the static pressure of the boundary layer on the outside of the plenum remains within a relatively narrow pressure band, the constant suction pressure on the inside will result in a relatively constant pressure gradient across the suction holes, and controlled boundary layer ingestion. While workable, this solution would require a large number of linear ribs 226 and 228 in some circumstances, which increases the weight and cost of the system.

Figure 3A:
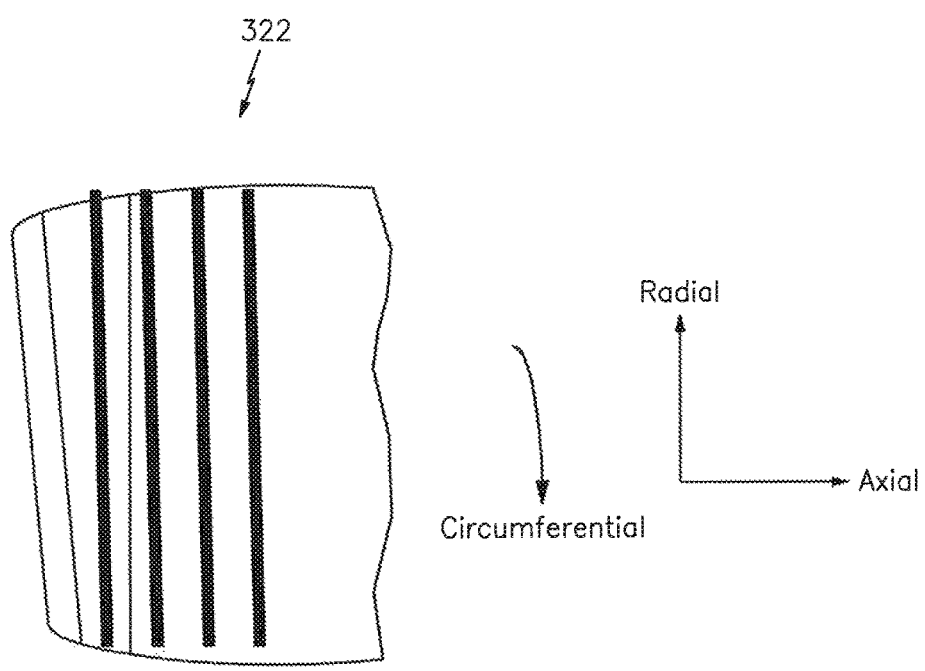
FIG. 3A illustrates a side perspective view of a nacelle including a reference line denoting lines of constant static pressure for the boundary layer around the nacelle.
Figure 3B:
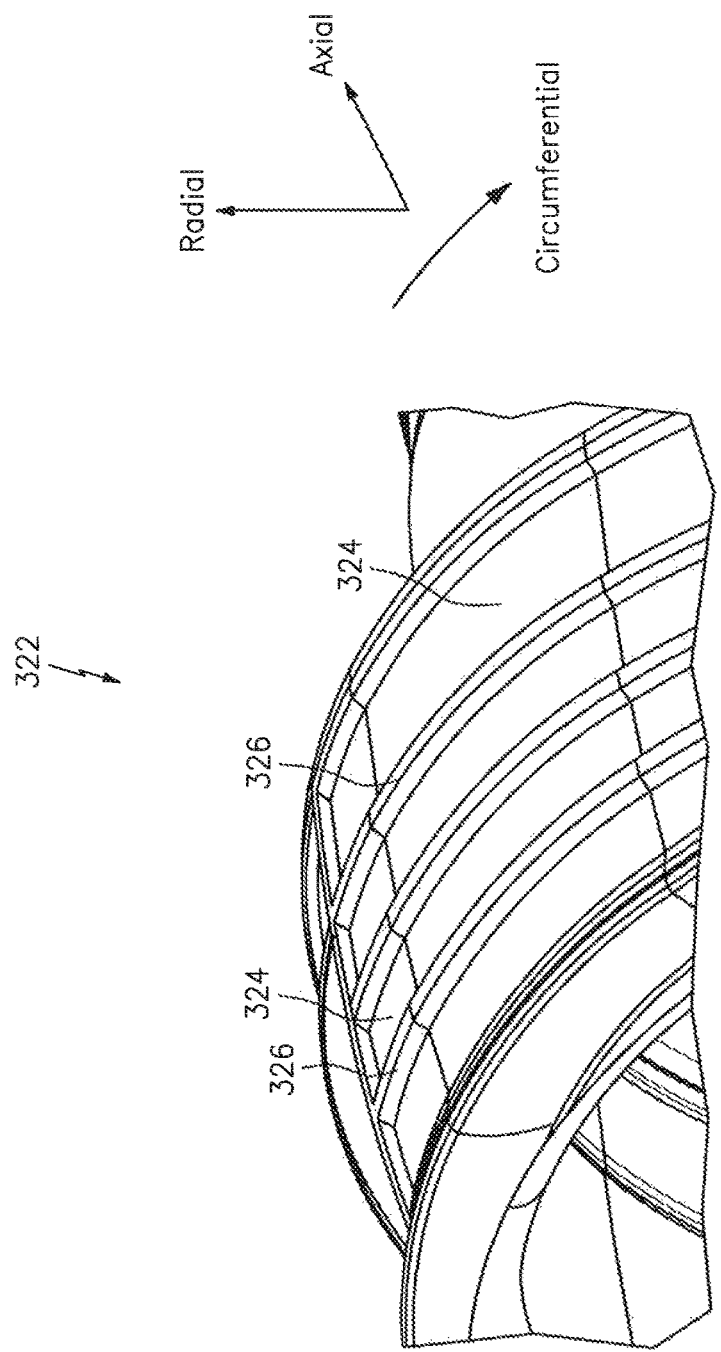
FIG. 3B illustrates plenums formed by ribs in the nacelle of FIG. 3A.

FIGS. 3A-3B illustrate a nacelle 322 in accordance with aspects of the disclosure. As shown in FIG. 3A, the lines of constant static pressure in the boundary layer around the exterior of the nacelle are now generally straight and do not vary axially, i.e. they are generally contained in a plane normal to the engine axis. This straightening of the lines would be achieved by appropriately affecting the external aerodynamic profile of the nacelle, and would be accomplished through analysis such as computational fluid dynamics. Accordingly, and as shown in FIG. 3B, the nacelle 322 may include or be associated with plenums 324 that are separated from one another basically only by linear, circumferential ribs 326 (where the ribs 326 may correspond to the ribs 226 of FIG. 2B). Each of the plenums 324 can be larger and extend over a greater surface area of the nacelle, and the weight and cost of the ribs to form the plenums, and the complexity of forming them (fewer fasteners, etc.), is greatly reduced. In the embodiment of the nacelle 322 shown in FIG. 3B, the plenums 324 are tailored axially at station planes.

The plenums 324 (which are shown as being separated from one another in FIG. 3B in essentially only one direction—illustratively, axially—by ribs 326) may be contrasted with the plenums 224 of FIG. 2B (which are shown as being separated from one another in two directions—axially and circumferentially—by the ribs 226 and 228).

Figure 4A:
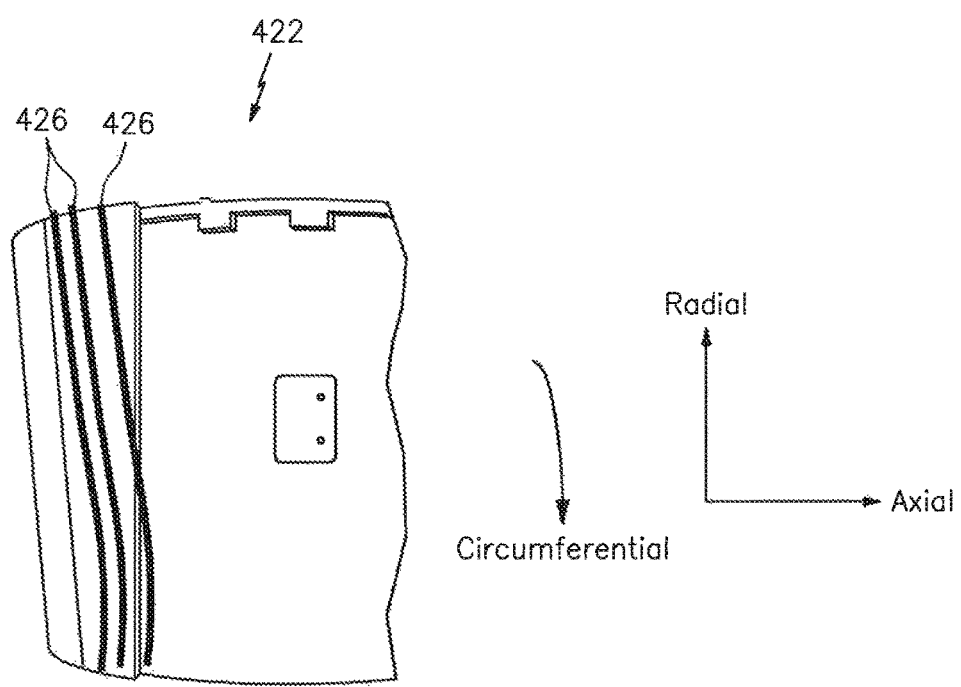
FIG. 4A illustrates a side perspective view of a nacelle including reference lines denoting lines of constant static pressure for the boundary layer around the nacelle.
Figure 4B:
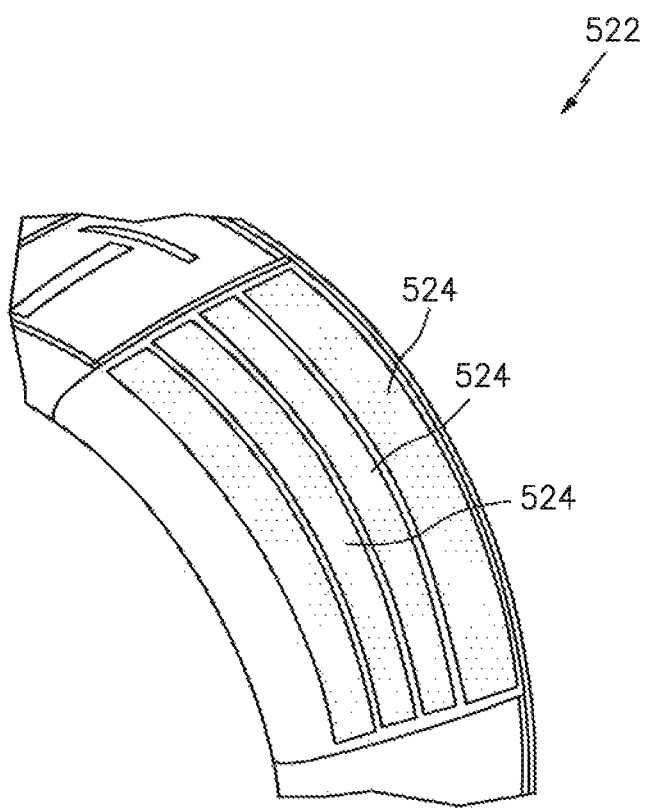
FIG. 4B illustrates plenums formed by ribs in the nacelle of FIG. 4A.

In some cases, sculpting the external shape of the nacelle to achieve generally straight lines of constant static pressure, as described above with respect to FIGS. 3A and 3B, may not be feasible. FIGS. 4A and 4B illustrates a nacelle 422 where a similar advantage in the construction of the plenums is achieved, but in a slightly different manner.

In FIG. 4A, the nacelle 422 is shown with lines of constant static pressure of the boundary layer 426 superimposed. The constant pressure lines 426 are relatively straight, but remain somewhat wavy and are not in a single plane normal to the engine axis.

The lines 426 may correspond to ribs, or serve to trace out the profile or shape of such ribs. Thus, ribs 426 used in connection with the nacelle 422 may be used to form hoop-shaped plenums such that each of the plenums traverses the entirety of the circumference of the nacelle 422, similar to the plenums 324 of FIG. 3B. However, unlike a given rib 326, a rib 426 may be oriented with some variation in the axial direction (e.g., a rib 426 might not be located at a single/fixed axial position).

Referring to FIG. 4B, a (portion of a) nacelle 522 (where the nacelle 522 may correspond to one or more of the nacelles 222, 322, or 422) is shown. The nacelle 522 may include one or more zones 524 formed in a skin of the nacelle 522. The location of a zone 524 may correspond to a location of a plenum (e.g., the plenums described above). For example, a zone 524 may be located on the nacelle 522 at the same axial and/or circumferential positions as a corresponding plenum. As shown in FIG. 4B, the nacelle 522 might not have any or very many axial ribs, but may include one or more circumferential ribs that follow closely the lines of constant static pressure 426 shown in FIG. 4A.

The zones 524 may include perforations/holes to enable a suction of air. For example, air associated with a flow that is external to the nacelle 522 (e.g., the flow 56 described above in connection with FIGS. 1A-1B) may be drawn into the nacelle 522 via the perforation/holes in the zones 524, potentially as a result of a vacuum formed between the exterior and the interior of the nacelle 522. The air that is drawn into the nacelle 522 may be discharged into a case compartment (not shown).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

I claim:

1. A nacelle of an aircraft, comprising:
  a surface that is profiled such that during cruise flight operation lines of constant static pressure of a boundary layer around the nacelle in a given region are not in a single plane that is normal to an engine axis and are wavy; and
  a plurality of ribs, each of the ribs being associated with and tracing a respective one of the lines of constant static pressure;
  a first of the ribs having a longitudinal centerline that extends circumferentially about the engine axis and follows a first one of the lines of constant static pressure, and the longitudinal centerline is displaced axially back and forth relative to the engine centerline as the first of the ribs extends along the longitudinal centerline away form a bottom end of the nacelle and towards a top end of the nacelle.

2. The nacelle of claim 1, wherein each of the ribs is oriented with a variation in an axial reference direction, wherein the axial reference direction is aligned with the engine axis.

3. The nacelle of claim 1, further comprising:
  a first plenum; and
  a second plenum,
  wherein the first and second plenums are separated from one another by one of the lines of constant static pressure and a respective one of the ribs.

4. The nacelle of claim 3, wherein the first plenum is configured to traverse a substantial portion of a circumference of the nacelle.

5. The nacelle of claim 1, further comprising:
  a zone formed in a skin of the nacelle,
  wherein the zone comprises perforations that are configured to enable a suction of air.

6. The nacelle of claim 5, wherein the perforations are configured to draw air from an air flow that is external to the nacelle into the nacelle.

7. The nacelle of claim 5, wherein a location of the zone on the nacelle corresponds to a location of a first plenum on the nacelle.

\* \* \* \* \*